INVENTORS
BURNEY KEETON ARNETT, Jr.
RICHARD W. PITMAN
BY
Busser, Smith & Harding
ATTORNEYS March 10, 1964 B. K. ARNETT, JR., ETAL 3,124,302

CODED TAPE PUNCHING APPARATUS

Filed May 16, 1962 5 Sheets-Sheet 2

INVENTORS
BURNEY KEETON ARNETT, Jr. &
RICHARD W. PITMAN
BY
Bosworth, Sessions & Mc???
ATTORNEYS March 10, 1964 B. K. ARNETT, JR., ETAL 3,124,302

CODED TAPE PUNCHING APPARATUS

Filed May 16, 1962 5 Sheets-Sheet 3

INVENTORS
BURNEY KEETON ARNETT, Jr. &
RICHARD W. PITMAN
BY
Bresser, Smith & Hardy
ATTORNEYS March 10, 1964 B. K. ARNETT, JR., ETAL 3,124,302

CODED TAPE PUNCHING APPARATUS

Filed May 16, 1962 5 Sheets-Sheet 4

INVENTORS
BURNEY KEETON ARNETT, Jr. &
RICHARD W. PITMAN
BY
Busser, Smith & Harding
ATTORNEYS

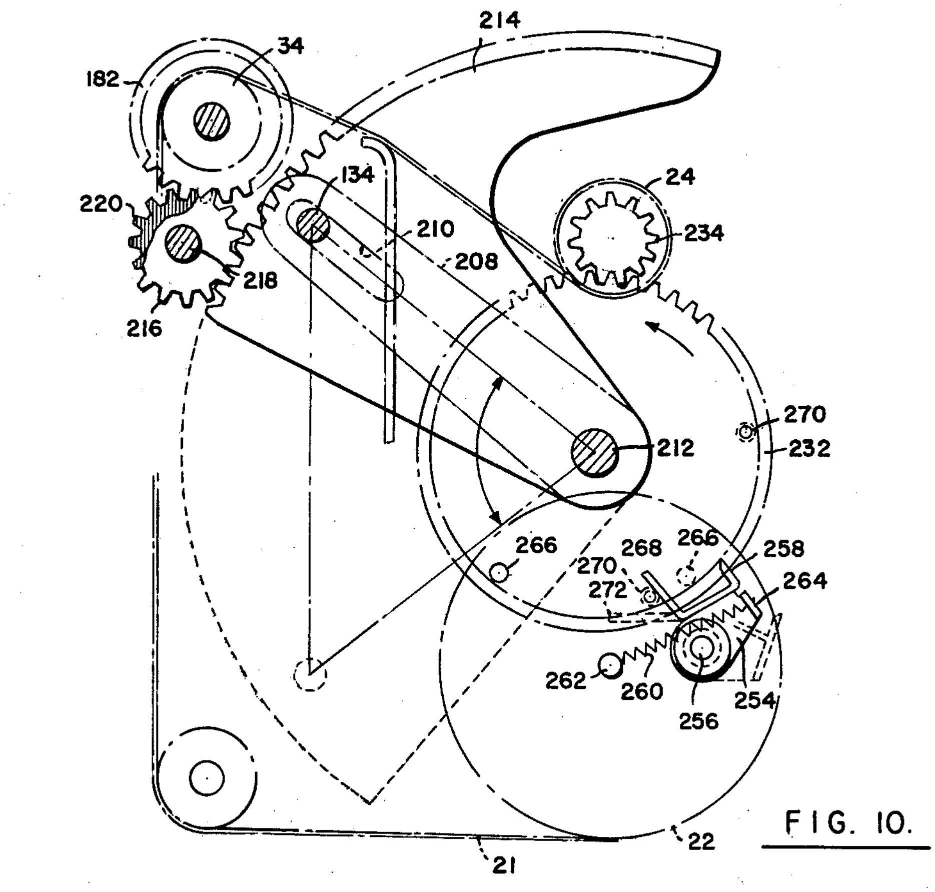
FIG. 10.
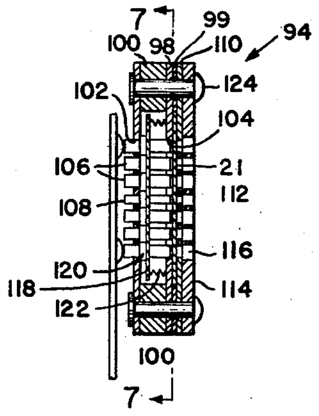
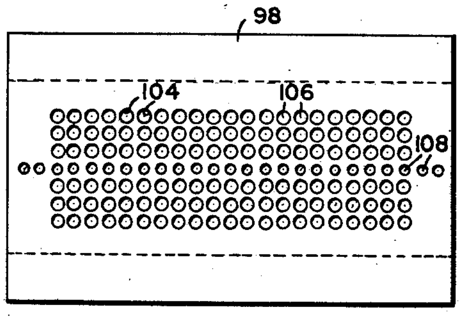
FIG. 7.
FIG. 6.
INVENTORS
BURNEY KEETON ARNETT, Jr. &
RICHARD W. PITMAN
BY
Bauer, Smith & Harding
ATTORNEYS United States Patent Office 3,124,302 Patented Mar. 10, 1964

3,124,302

CODED TAPE PUNCHING APPARATUS

Burney Keeton Arnett, Jr., Malden Ave., Holden, Mass., and Richard W. Pitman, 7807 Cobben Road, Cheltenham, Pa.

Filed May 16, 1962, Ser. No. 195,196
16 Claims. (Cl. 234—45)

This invention relates generally to devices for the punching of coded tapes such as tapes which would be suitable for use in automatic data processng equipment.

By way of example, the apparatus in acordance with this invention is useful in a manufacturing assembly line where each worker is required to make frequent records of work performed. These records typically require the recording of such information as the worker's identification number, information about the work order and details of the operation performed at the particular station.

In accordance with this invention, punching apparatus is provided for recording information of the indicated type in a form for subsequent use by electronic data processing and accounting equipment. The information is recorded on a paper tape by the punching of holes therein in a coded arrangement. In the specific embodiment disclosed, a portion of the information to be recorded is provided by coded slugs or tokens which are inserted into the apparatus which punches the tape in accordance with the coded arrangement on the slugs. Also, provision is made for the entry of additional data by the setting of selectable levers.

It is the general object of this invention to provide punching apparatus of the indicated type which is mechanically operable, reliable and of compact construction and which can be manufactured at a low cost.

Some of the features of the punching apparatus in accordance with this invention are the provision of means for effecting progressive punching, means for insuring a full stroke of the operating arm to effect complete punching and means for effecting a feed of the tape past the punching station only during the return stroke of the operating arm when no punching occurs. Another feature is the provision for automatic recoiling of the punched tape in convenient form for unloading and transportation.

The above and other objects and features of the invention will become apparent from the following description read in conjunction with the accompanying drawings, in which:

FIGURE 6 is a sectional view of a detail of the punching mechanism;

FIGURE 7 is a section taken on the line 7—7 of FIGURE 6;

FIGURE 10 is a fragmentary view of a full-stroke mechanism, the gear drive for the feed reel and the drive for the takeup reel.

Figure 1:
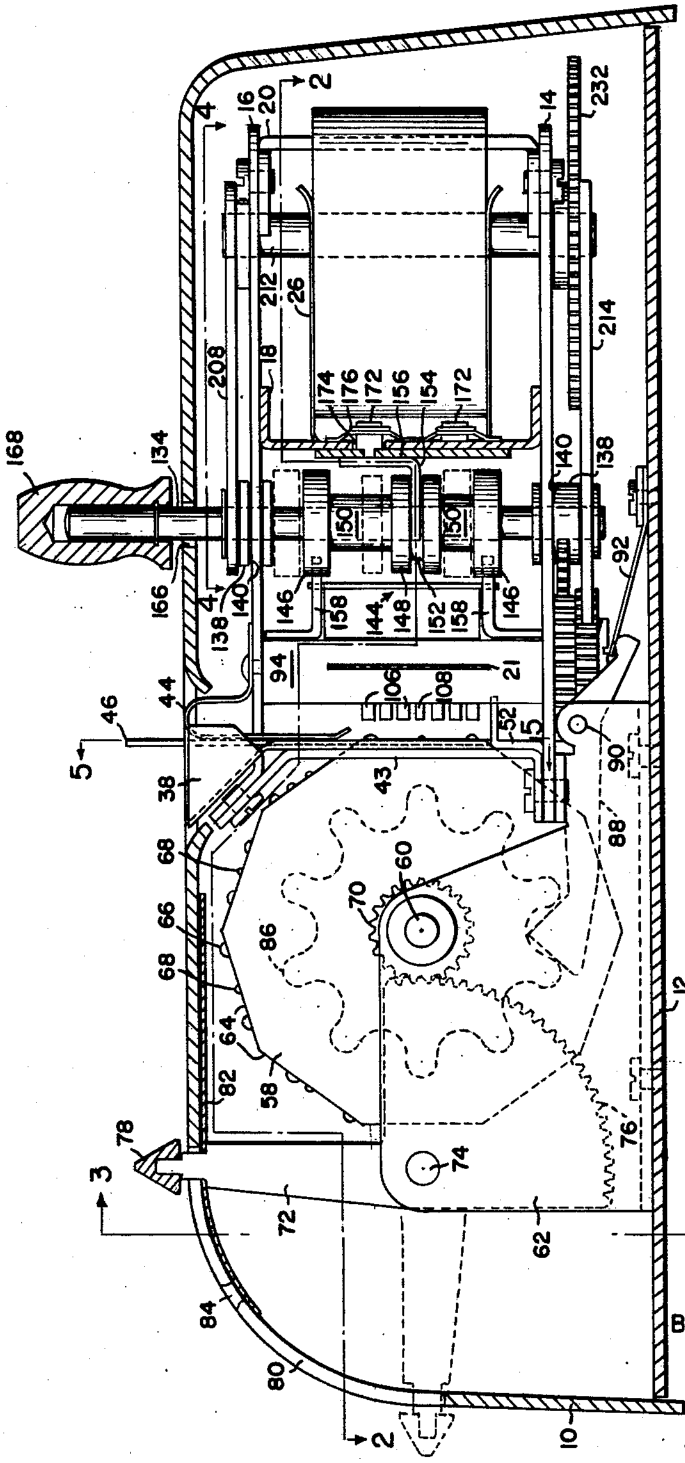
FIGURE 1 is a side elevation of a punching apparatus in accordance with this invention.

In the illustrated form of the invention shown in the drawings, there is provision for seventeen columns of information. Twelve of the columns are controlled by three slugs or tokens having five, four and three columns.

There is also provided a manual selector for five columns.

Referring more particularly to FIGURE 1, the apparatus is shown as comprising a housing including a top cover 10 and a base plate 12 on which the essential parts of the apparatus are mounted. A pair of supporting plates 14 and 16 are mounted in vertically spaced relationship on the base plate 12 by suitable support means. The plates 14 and 16 are vertically spaced by a pair of channel members 18 and 20 having end portions which are secured to the plates 14 and 16 by mounting screws. Accordingly, the plates 14 and 16 extend in spaced relationship horizontally of the apparatus.

A roll of paper tape 21 is wound on a tape supply reel 22 which reel is mounted on a spring holder 26 along with a takeup reel 24. Holder 26 has upper and lower bifurcated arms and a base portion secured to plate 18. The supply reel 22 is journalled in the opposed arms of the spring holder 26. The paper tape 21 passes from the supply roll around an idler roller 32, through the punching apparatus to be described hereafter, around a feed reel 34 to the takeup reel 24. Feed is effected by a sprocket 180 mounted on the feed reel 34 and engaging feed holes on the tape 21.

The drive of the takeup reel 24 is through a friction clutch arrangement to be described hereafter, the takeup reel being driven at a rate so that a minimum diameter of the tape wound thereon it will tend to advance the tape faster than the sprocket 180 so as to keep the tape tensioned.

Figure 5:
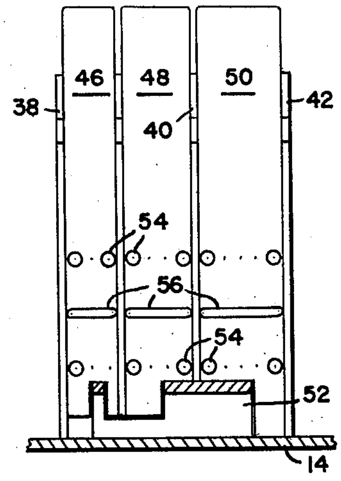
FIGURE 5 is a section taken on the line 5—5 of FIGURE 1.

Three guides 38, 40 and 42 are mounted on a vertically extending support plate 43 secured to plates 14 and 16 by mounting screws. The guides 38, 40 and 42 have flared upper ends to facilitate insertion of three tokens 46, 48 and 50, respectively, and cooperate with a leaf spring 44 to define three slots adapted to receive the tokens. A stop member 52 is located at the bottom of the slots and is shaped in accordance with cut-out portions in the bottom of the tokens. This arrangement insures that the proper token is inserted into its corresponding slot and that the token has the correct orientation, that is, with the bottom of the token at the lower end of the slot and with the coded side of the tokens facing the punching mechanism. This arrangement is best shown in FIGURE 5.

The tokens have raised projections or dimples 54 on one side thereof and may be made of metal or plastic. As will be described hereafter, the projections 54 mechanically control and select the operation of the punches. The tokens 46, 48 and 50 are of different widths so as to accommodate, respectively, five, four and three rows of projections 54. Each of the tokens is provided with a horizontally extending rib 56 projecting outwardly in the same manner as projections 54. These ribs 56 serve to actuate punches which provide feed holes in the tape as will be described hereafter.

Provision is made for inserting numerical data by the selective depression of levers by the operator. This selector means is positioned adjacent the slugs and comprises five discs 58 mounted axially on a horizontally extending pin 60 mounted in the spaced vertical sides of a support member 62. Each of the discs has ten circumferential flat faces indicated generally at 64. Each of the flat faces 64 has projections 66 thereon which are adapted to operate the code punches in the same manner as the projections 54 on the tokens. A central projection 68 is provided on each face 64 for actuating a feed hole punch. A gear 70 is fastened to each of the discs.

Figure 3:
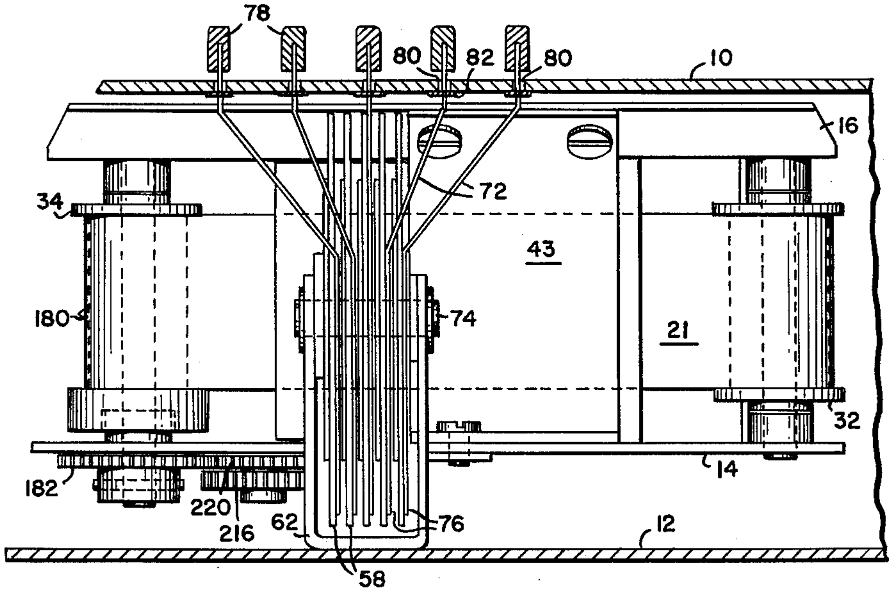
FIGURE 3 is a fragmentary section taken on the line 3—3 of FIGURE 1.

As is best shown in FIGURE 3, five lever arms 72, having an offset upper portion, are mounted on a pin 74 supported by the sides of member 62. Each of the lever arms 72 is joined with a gear segment 76 which cooperates with one of the gears 70 of each of the discs 58.

Suitable finger buttons 78 are mounted on the ends of the lever arms 72 which project outwardly of the cover 10. It will be apparent that by movement of the lever arm 72 between the full line position and the dotted line position shown in FIGURE 1 the corresponding disc 58 can be located to position any one of its flat faces 64 in opposed relation with the punching mechanism.

As each of the arms 72 is moved along its guide slot 80 in the cover 10, an indicator strip 82, mounted on this arm, presents a number from zero to nine in registry with a window 84 in the cover 10. The disc 58 associated with a particular lever arm 72 is rotated by the cooperating gear segment 76 and the gear 70 of this disc so that the face 64 which represents the number viewed in the window is in front of the punching station.

Means are provided for holding the discs in each of the ten settable positions thereof. To this end, there is provided a detent cam 86 for each of the discs 58, this detent cam having ten notches and being secured to the discs for rotation therewith. A detent arm 88 for each disc is pivoted at pin 90 and cooperates with the notches in the detent cam 86 to hold the disc 58 in one of its ten settable positions. A leaf spring 92 engages the opposite end of the detent arm 88 to bias the same into a position engaging the detent cam 86. The spring 92 permits movement of the detent arm out of its engaging position during rotation of the discs 58. The support member 62 mounts the entire selecting mechanism on the base plate 12.

The punching mechanism is indicated generally at 94 and comprises a front plate 96 and a guide plate 98 spaced by washers 100. Plates 96 and 98 have aligned openings 102 and 104, respectively, receiving cylindrical punches 106. There are provided seventeen rows of punches, each row cooperating with one of the rows of projections on the tokens 40, 42 and 44 or the discs 60. The number of the punches in each row and the arrangement of the punches, of course, depends upon the particular code involved.

In the illustrated form of the invention, there is provided six code punches 106 in each row and a centrally positioned feed hole punch 108. A die plate 110 is positioned in opposed spaced relationship to the guide plate 98 and is spaced therefrom, by washer 99, a distance sufficient to permit the passage of the tape 21. Die 110 has openings 112 therein in alignment with each of the punches 106 and 108 and adjacent the cutting ends thereof. Openings 112 are of a size to receive the cutting ends of the punches 106 and 108 with slight clearance so that a cutting action occurs as the punches enter openings 112. The arrangement of the openings 112, and accordingly the arrangement of the punches 106 and 108 is illustrated in FIGURE 7.

A backing plate 114 is positioned adjacent the die 110 and has openings 116 therein in alignment with the openings 112 to permit passage of the punched portions of the tape. A punch return plate 118 is mounted on the rearward side of annular shoulders 120 which are formed on the punches 106 and 108. The punch return plate 118 is biased by a plurality of coil springs 122 and cooperates with the shoulders 120 of the punches to return the same to the starting thereof with the shoulders 120 engaging the front plate 96 as is shown in FIGURE 6. The cutting ends of the punches 106 may be of any suitable shape to provide a sharp circumferential edge thereon so that there will be efficient punching of the paper tape. The plates 96 and 98, the washers 100, the die 110, the washers 99 and the backing plate 114 are all secured together by suitable mounting screws 124 to provide a unitary frame or structure. A pair of cam rails to be described hereafter are also mounted on this frame.

Figure 2:
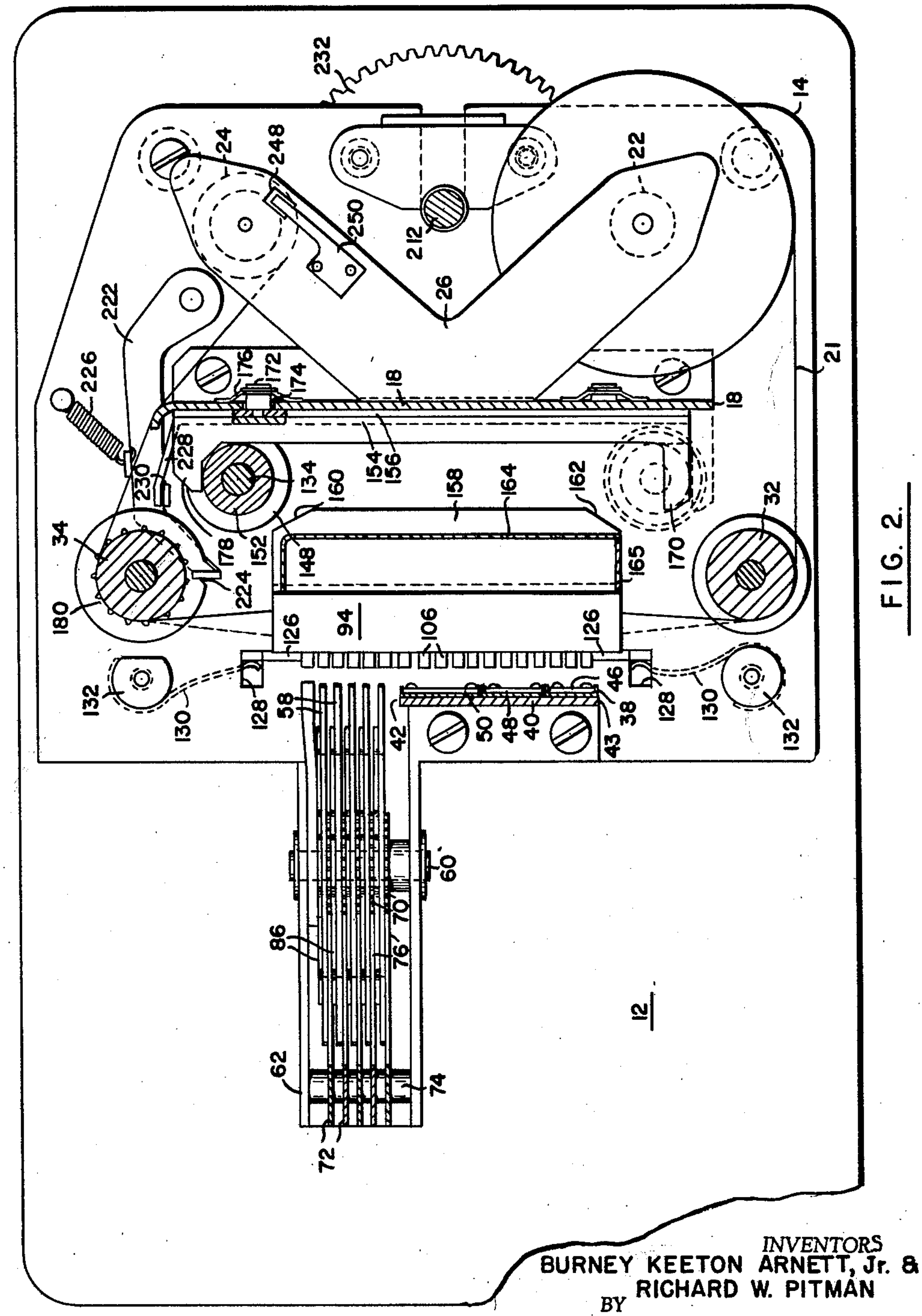
FIGURE 2 is a section taken on the line 2—2 of FIGURE 1.

The punching mechanism frame is mounted for forward movement for effecting the punching of the tape. The mounting for the punching means comprises supporting plates 14 and 16 which, as is best shown in FIGURE 1, guide the punching mechanism for horizontal sliding movement. Means for limiting the sliding movement include two pairs of arms 126 secured at upper and lower portions to the front plate 96 and extending therefrom into four slots 128 in the plates 14 and 16. The slots 128 limit the movement of the arms 126 and accordingly limit the movement of the punching mechanism. Four leaf springs 130 mounted on studs 132 secured to the plates 14 and 16 engage the arms 126 and serve to bias the punching mechanism toward a rearward home position as illustrated in FIGURE 2.

Means are provided for actuating the punching mechanism from the home position forwardly to a tape punching position. This actuating means effects progressive punching by causing a rocking of the punching mechanism. Progressive punching spreads the load over a greatest operating stroke and reduces the strain on the parts thereby increasing the life of the apparatus.

Figure 4:
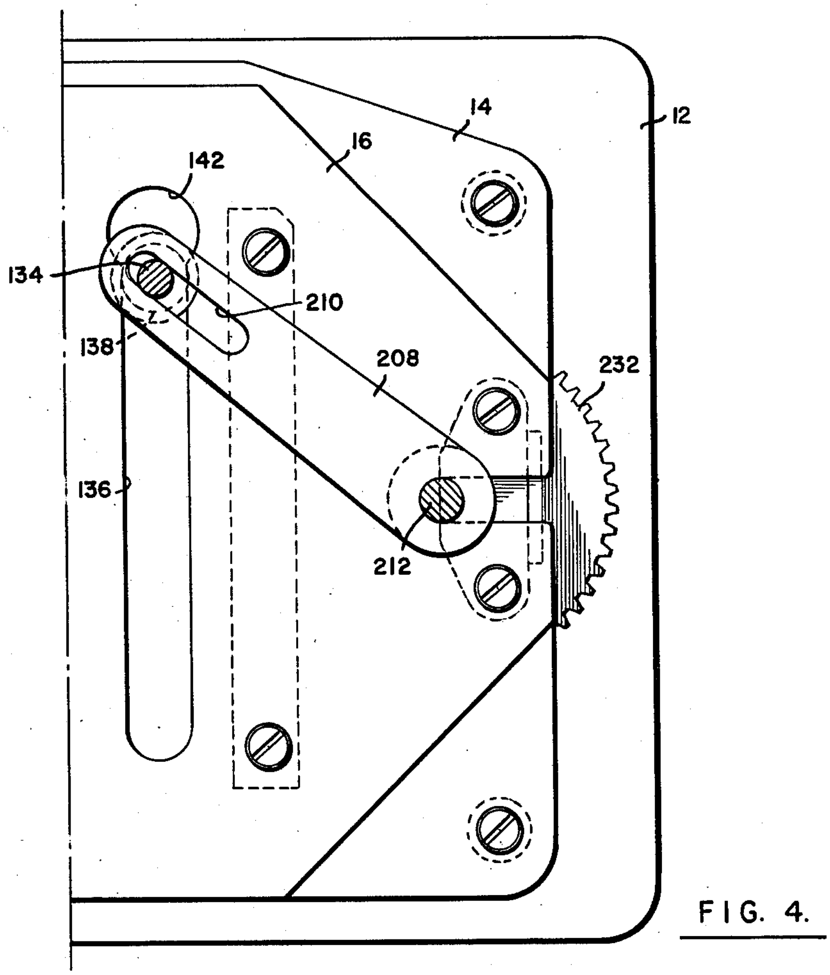
FIGURE 4 is a fragmentary section taken on the line 4—4 of FIGURE 1.

The actuating mechanism comprises a vertically extending actuator rod 134 which is guided for transverse linear movement by transverse slots 136 in the plates 14 and 16. A pair of rollers 138 are secured on the rod 134 and have grooved portions 140 therein embracing the plate areas defining the transverse slots 136. The cooperation between the grooved rollers 138 and the transverse slots 136 serve to guide the rod 134 for transverse linear movement. The transverse slots 136 have an enlarged circular portion 142 at one end thereof to permit insertion of the rollers 138 into engagement with the plates 14 and 16 (see FIGURE 4).

A cam actuator assembly 144 is mounted on rod 134 between the plates 14 and 16 and is rotatable and axially slidable on the rod 134. At the ends of this assembly 144 there is provided cam rollers 146 which actuate the punching mechanism as will be described hereafter. Mounted between rollers 146 is a control collar 148 which is spaced from the rollers 146 by suitable spacers 150. The control collar 148 comprises a grooved cylindrical member 152, the groove of which is adapted to receive an end of rail member 154 which is fastened to a plate 156 secured to the supporting member 20 for a purpose to be described hereafter. The rail 154 serves to vertically position the actuator assembly on the rod 134.

In the starting position of the apparatus, the actuator assembly 144 is positioned in the full line position shown in FIGURES 1 and 2 with the rollers 146 in alignment with a pair of cam rails 158 mounted on the punching frame. The cam rails 158 comprise upper and lower members which are secured to the backing plate 114 of the punching frame. The cam rails 158 have sloping portions 160 and 162 at the ends thereof. A rectangular housing 164 open at one end is mounted between the cam rails 158 and serves as a hopper for receiving the punched portions of the tape. Housing 164 is provided with a removable cover 165 to prevent punchings from falling into the mechanism.

During the punching stroke of the apparatus, the cam rollers 146 engage the rails 158 to force the punching assembly forwardly to effect punching. During this forward movement selected punches 106 are contacted by the coded projections 54 and 66 on the tokens and discs to restrict movement thereof with the frame to cause the cutting ends to enter the holes 112 in die 110 to effect perforation of the tape 21. As the rollers 146 move transversely across the cam rails 158, there is effected a rocking motion of the punching mechanism to thereby effect progressive punching. This rocking is effected against the bias of the springs 130 which return the punching mechanism to the home position when the rollers 146 move out of engagement with the cam rails 158.

The rod 134 projects upwardly through a transverse slot 166 in the top cover 10 and has an actuator knob 168 secured to its upper end. The actuator knob 168 is grasped by the operator during the power stroke in which the rod 134 is moved transversely across the apparatus from the home position to a full-stroke position.

Referring again to the progressive punching, it is noted that as the power stroke is started, the rollers 146 ride up the slopes 160 of rails 158 to cause the first row of punches to pierce the tape. As the rollers 146 move progressively along the cam rails 158, additional rows of punches are forced into operation. When the rollers 146 come in contact with the slopes 162 all of the punches have been operated and the punching assembly is returned to its home position by the action of springs 130.

The shaft 134 is now prepared to start its return movement. During this return movement the tape 21 is fed through the punching mechanism to present the successive unpunched portion of the tape 21 into a perforating position. Means are provided to prevent any punching operation during the return movement of the shaft 134. Accordingly, the rail member 154 is provided with a projecting leg 170. This leg 170 is engaged by the control collar 148 at the end of the power stroke. The plate 156 which supports the rail 154 carries a pair of studs 172 which ride in diagonal slots 174 in the support plate 18. The slots 174 extend at a 45° angle with the horizontal. Friction washers 176 are mounted on the ends of the studs 172 and frictionally contact the plate 20 to hold the plate 156 in the positions into which it is placed.

As the rod 134 reaches the end of the power stroke, the control collar 148 contacts the leg 170 of rail 154. As the rod 134 continues its transverse movement to the end of its power stroke, the rail 154 is moved from the full line position shown in FIGURES 1 and 2 to the dotted line position. Since the slots 174 in plate 20 extend upwardly from left to right as viewed from the front of the machine, the plate 156 will be moved upwardly carrying rail 154 therewith thereby causing movement of the actuator assembly to the dotted line position shown in the drawings. In this position, the cam rollers 146 are out of alignment with the cam rails 158 so that during the return stroke of the rod 134 the punching mechanism will not be actuated.

When the rod 134 approaches the home position during the return stroke, the control collar 148 contacts a projecting leg 178 of the rail 154. As the return movement of the rod 134 continues, the rail 154 is moved from the dotted line position to the full line position. During this movement the studs 172 move from the upper ends of the diagonal slots 174 to the lower ends thereof to thereby restore the actuator assembly to the full line position. In this position, the cam rollers 146 are in alignment with the cam rails 158.

Figure 9:
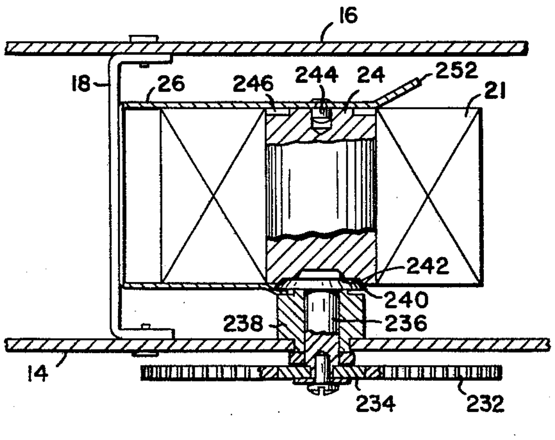
FIGURE 9 is a fragmentary detail view of the takeup reel.
Figure 8:
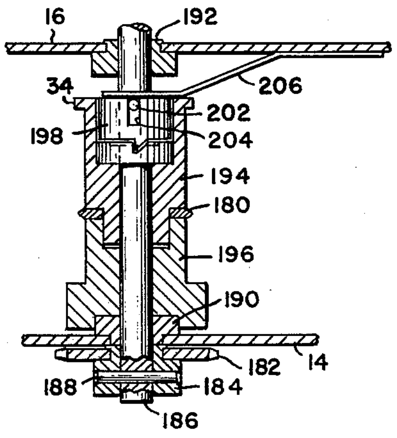
FIGURE 8 is a fragmentary detail view of the feed reel and a one-turn clutch drive therefor.

Means are provided for feeding the tape 21 during the return stroke of the actuator rod 134. The feed is effected directly by a sprocket 180 on the feed reel 34, the sprocket having teeth cooperating with the feed holes formed in the tape 21 during the punching operation. The feed reel 34 is rotated exactly one turn in order to advance the tape to a successive position. The feeding movement is effected by rotation of the feed reel drive gear 182 in the proper direction. Gear 182 drives the reel 34 through a single tooth clutch mechanism shown in detail in FIGURE 9.

The gear 182 is fastened to a cylindrical member 184 keyed to a vertically extending shaft 186 by a pin 188. The shaft 186 is mounted for rotation in bearing members 190 and 192 mounted on the plates 14 and 16, respectively. The shaft 186 extends through the center of the feed reel 34 which comprises upper and lower members 194 and 196, respectively, having the sprocket 180 secured therebetween. The clutch mechanism is mounted in a cylindrical recess in the upper end of the upper member 194 and comprises a driving element 198 having a tooth adapted to engage a notch in a cooperating driven element 200. A pin 202 carried by shaft 186 engages with an axial slot 204 in the driving element 198 to connect the shaft 186 and the element 198 for conjoint rotation and to permit axial relative movement therebetween. By reason of this arrangement, driving element 198 is movable axially of the shaft to permit disengagement thereof from the driven element 200. The driven element 200 is keyed to the upper member 194 of reel 34 for conjoint movement therewith.

A leaf spring 206 mounted on the plate 16 biases the element 198 into the engaging position. The tooth and notch arrangement has cooperating sloping faces to effect a camming action which disengages the clutch elements when the driving element 198 is rotated in one direction and has cooperating axially extending faces to effect driving engagement between the clutch elements upon rotation of the driving element in the other direction. Accordingly, the rotation of the gear 182 to effect counterclockwise rotation of the shaft 186 and the driving element 198 as viewed from the top of FIGURE 9 will, assuming the driving reel 34 is held against rotating movement, cause the driving element 198 to be cammed out of engagement with the driven element 200. This will permit free rotation of the shaft 186 without any corresponding rotation of the driven element 200. However, rotation of the gear 182 in a clockwise direction will, assuming there is no means preventing rotation of the reel 34, cause a corresponding movement of the element 200 and the reel 34.

Means are provided interconnecting the feed reel drive gear 182 and the actuator rod 134. This means comprises an arm 208 (FIGURE 10) having a slot 210 therein through which the actuator rod 134 passes. The opposite end of this arm 208 is fastened to a rod 212. Accordingly, as the actuator rod 134 is reciprocated transversely of the apparatus, arm 208 is oscillated (about 75°) to cause rotation of the rod 212. Rod 212 is mounted for rotation in the plates 14 and 16 and extends outwardly above and below these plates. At its lower end, rod 212 carries a gear segment 214 which rotates therewith. Gear segment 214 meshes with an idler gear 216 which is mounted on a common shaft 218 with another idler gear 220. The gear 220 meshes with the clutch driving gear 182. Accordingly, movement of the actuator rod 134 is transmitted to the clutch drive gear 182 by way of the arm 208, rod 212, gear segment 214, gear 216 and gear 220.

The parts are constructed and arranged so that each transverse movement of the actuator rod 134 effects one complete revolution of the gear 182 and accordingly, assuming the parts are positioned for feeding action, effects one complete revolution of the feed reel 34. As stated previously, the movement of the feed reel 34 is sufficient to advance the paper tape to a new position wherein an unpunched portion of the tape is presented before the punching mechanism.

Means are provided for normally locking the feed reel 34 against accidental rotation. Such means comprises a pawl 222 (FIGURE 2) pivotally mounted at one end and having the other end engageable in a notch 224 in the lower member 196 of the feed reel 34. A spring 226 biases the pawl 222 toward a position in which the end thereof engages the notch 226 as is best shown in FIGURE 2. An arm 228 is mounted on the rail 154 in opposed relationship with a lip 230 on pawl 222 so that when the rail 154 is moved at the end of the power stroke, the arm 228 contacts the lip 230 to cause counterclockwise rotation of pawl 222 about its pivot to disengage the pawl 222 from the notch 224 in the feed reel 34. Accordingly, the feed reel 34 is free to rotate during the return stroke of the device. At the end of the return stroke, the pawl 222 is again moved into the engaging position by the spring 226 since the arm 228 is moved away from the lip 230 permitting clockwise rotation of pawl 222.

The storage or takeup reel 24 (FIGURE 9) is operated by a friction clutch which drives the reel 24 so that it takes up the tape 21 fed from the feed reel 34. The drive for the takeup reel 24 comprises a gear 232 fixedly mounted on rod 212 at a lower portion thereof. Gear 232 meshes with a gear 234 fixedly mounted on a vertically extending shaft 236 journalled in a bearing 238 mounted in plate 14. The upper end of this shaft 236 has a drive disc 240 integral therewith. The disc 240 is nested within a pocket 242 in the lower end of the reel 24 so as to frictionally engage the same. The upper end of the reel 24 is journalled in a pin 244 carried by the upper arm of the spring holder 26 so that the reel 24 is mounted for rotation about a vertical axis. The upper end of the reel 24 is provided with ratchet teeth 246 engageable through an opening in the spring holder arm by a pawl 248 (FIGURE 2) carried on the end of a leaf spring 250 mounted on the top of the arm of the spring holder 26. This pawl and ratchet arrangement restricts the movement of the reel 24 to the direction in which the tape is wound thereon, unwinding movement thereof being prevented by this arrangement. Suitable clamping slots (not shown) are provided in the reel 24 for clamping the end of the tape 21. Removal of the reel 24 and the tape wound thereon is effected by moving the upper arm of the spring holder 26 upwardly to release the pin 244 from engagement with the reel 24. A flared tab 252 is provided so that the arm of the spring holder 26 may be grasped easily by the operator during a reel removing operation. The spring holder arm for the supply reel is provided with a similar tab for the same purpose.

The parts of the takeup reel drive are constructed so that the drive shaft of the friction clutch is driven at a rate so that for minimum diameter of tape wound on the reel 24, the friction drive will tend to advance the tape faster than the feed reel 34. Accordingly, the tape is kept tensioned and no slack will be formed in the tape feed. Of course, the friction drive slips when the feed is excessive so that there is no danger of the tape being torn.

Once the power stroke is started, it would be undesirable to permit a return movement of the actuator rod 134 until it has completed a full power stroke. This insures that punching must be completed prior to the feed of the tape and the restoration of the parts to the initial or home position. The mechanism illustrated in FIGURE 10 is the full-stroke means provided for this purpose and comprises a latching arm 254 rotatably mounted on a pin 256 mounted in the plate 14. This arm 254 carries a pawl 258 engageable with the teeth of gear 232 under the bias of a toggle spring 260 mounted in tension between a pin 262 and a tab 264 on arm 254. The spring 260 is connected so as to provide a toggle action over the center line between the pins 256 and 262 to snap the pawl 258 into and out of engagement with the teeth of gear 232.

When the pawl 258 engages gear 232 this gear is prevented from rotation in a clockwise direction and since gear 232 and arm 208 are both keyed to rod 212, this arrangement prevents a corresponding movement of the arm 208 which, in effect, prevents any return of the actuator rod 134. However, the pawl arrangement permits counterclockwise rotation of gear 232 and, accordingly, does not restrict the power stroke of the actuator rod 134.

When the rod 134 has made a full stroke, this position being indicated in dotted lines in FIGURE 10, the parts carried by the rod 212 have rotated approximately 75° from the starting position. At the end of a full power stroke, a pin 266 mounted to project from the upper side of gear 232 contacts an extending arm 268 on the arm 254 to cause rotation thereof about its pivotal axis to a point beyond the dead center position of the toggle arrangement, whereby arm 254 is moved to the dotted line position. In this position, the pawl 258 is disengaged from the gear 232 thereby clearing the mechanism for return movement. At the close of the return stroke, a pin 270 mounted to project from the underside of gear 232 contacts an extending tab 272 on the arm 254 to cause rotation of the arm 254 to a position wherein the toggle spring returns the pawl 258 into engagement with the gear 232.

It will thus be apparent that the full stroke mechanism functions to prevent any return movement of the actuator rod 134 once the power stroke is started and to permit return movement only after the completion of a full stroke. Moreover, this mechanism is reset to its active position at the end of the return stroke.

In operating the apparatus, the operator inserts the three tokens 46, 48 and 50 and sets the selector levers 72 to the desired positions. The tokens present projections 54 in alignment with the punches 106 which will represent, in coded form, the information on the tokens. The setting of the levers places the desired flat faces 64 containing projections 66 in alignment with the punches 106 so as to effect coded punching in accordance with the selected numbers from zero to nine.

Referring more particularly to FIGURES 1 and 2, the parts are initially in the home position as shown in full lines in these figures. The operator then manually moves the actuator rod 134 transversely across the apparatus from the full line position to the dotted line position. This movement is the power stroke in which several mechanical operations are effected. The cam rollers 146 contact the cam rails 158 to effect a forward rocking movement of the punching frame whereby holes are progressively punched in the tape 21 in accordance with the coded projections 54 and 66 of the tokens 46, 48 and 50 and the discs 58, which projections prevent forward movement of certain of the code punches 106. These restricted punches pierce the tape and enter the die 110 to provide coded openings in the tape. Also, feed holes are punched in the paper by the action of the ribs 56 on tokens and the central projections 68 on discs 58 contacting the feed hole punches 108 in the same manner as the punching of the coded holes.

At the close of the power stroke, the cam roller assembly is raised to the dotted line position by reason of the studs 172 moving up in the slots 174 to cause a raising movement of the rail 154. This movement clears the rollers 146 from alignment with the cam rail 158 so that there will be no contact therebetween during the subsequent return movement.

The transverse movement of the actuator rod 134 causes a 75° rotation of the arm 254 and a corresponding rotation of the rod 212 and the gear segment 214 and gear 232 which are connected thereto. Gear segment 214 acts through idler gears 216 and 220 to actuate the feed reel driving gear 182 through one revolution in a counterclockwise direction. However, since the feed reel 34 is held against rotation by the pawl 222 and the clutch element 198 is cammed to a nonengaging position, the feed reel 34 will not rotate along with the gear 182. At the close of the power stroke, the pawl 222 is actuated out of engagement with the feed reel 34 by the cooperation between arm 228 and lip 230 as was discussed previously.

During the power stroke the gear 232 acts through gear 234 to rotate the friction driving disc 240 in a direction tending to cause clockwise rotation of the takeup reel 24. However, pawl 248 engages the ratchet teeth 246 in the reel 24 to prevent such movement whereby the drive disc 240 slips relative to the reel 24.

During the power stroke, the full-stroke mechanism functions to insure that the actuator rod 134 makes a complete stroke and functions to prevent any return movement until the stroke is completed at which time the toggle arrangement clears the gear 232 for the return clockwise movement. Details of the operation of the full stroke mechanism were described previously.

The operator then returns the actuator rod 134 manually to the home position. If desired, a spring means may be provided automatically returning rod 134. The transverse movement of the rod 134 returns the cam roller mechanism to the full line position shown in FIGURE 1, downward movement occurring at the end of the return stroke as a result of the downward movement of the studs 172 in their slots 174. As discussed previously, the cam rollers 146 avoid any contact with the cam rails 158 during this return movement.

The return movement of the rod 134 causes a 75° rotation of the arm 208 in a clockwise direction and a corresponding rotation of the rod 212, gear segment 214 and gear 232. During this movement, gear segment 214 causes rotation of the drive gear 182 thereby to actuate the single-tooth clutch mechanism to drive the sprocket 180 through one revolution. Accordingly, the tape 21 is fed past the punching position and a new unpunched portion thereof is presented to this position. At the close of the return stroke, arm 228 moves away from the lip 230 which follows this movement so that the pawl 222 is returned into engagement with the takeup reel notch 224.

Also, the gear 232 actuates the friction drive disc 240 to cause a counterclockwise movement of the takeup reel 24 whereby the tape 21 fed from the feed sprocket 180 is wound on the takeup reel 24. At the close of the return stroke, the pin 270 actuates the toggle mechanism to effect re-engagement of the pawl 258 with the teeth of the gear 232.

The apparatus is now set for a subsequent punching operation which is effected in the same manner as described above with the exception that different tokens and settings of the levers 72 may be used.

It will be apparent that the apparatus herein disclosed is a reliable, compact mechanically operable mechanism which has a variety of uses in the punching of tapes for processing in conventional accounting machines.

Furthermore, since it will be evident that the construction and arrangement of the parts of the apparatus herein disclosed may be varied without departing from the scope of the invention, it will be understood that the invention is not to be regarded as limited except as required by the following claims.

What is claimed is:

1. Apparatus for providing coded perforations in a record member at a perforating station comprising punching means at the perforating station including a movably mounted frame and a plurality of rows of punches carried by said frame, means for selecting which of said punches is activated to perforate said record member during a punching operation of the apparatus, said selecting means being located in opposed relation to said punching means and including a plurality of code members having elements arranged in a coded relationship in alignment with selected punches, and actuator means movable across said perforating station to effect perforation of the record member by contact between said elements and said selected punches, said actuator means contacting said frame to move said rows of punches progressively toward said selecting means for sequential contact of said selected punches with said elements whereby said record member is punched progressively.

2. Apparatus for providing coded perforations in a record member at a perforating station comprising punching means at said station including a movably mounted frame and a plurality of rows of punches carried by said frame, means for selecting which of said punches is activated to perforate said record member during a punching operation of the apparatus, said selecting means being located in opposed relation to said punching means and including a plurality of code members having elements arranged in a coded relationship in alignment with selected punches, and actuator means movable across said perforating station to effect perforation of the record member by contact between said elements and said selected punches, said actuator means contacting said frame to move said rows of punches progressively toward said selecting means for sequential contact of said selected punches with said elements whereby said record member is punched progressively, said record member being located at said perforating station between said punches and a die having holes adapted to receive one end of said punches, said elements contacting the other ends of said punches during said movement of said frame to effect movement of said punches through the record member into said die to perforate the record member.

3. Apparatus for providing coded perforations in a record member at a perforating station comprising punching means at said station including a frame extending thereacross and a plurality of rows of punches carried by said frame, means for selecting which of said punches is activated to perforate said record member during a punching operation of the apparatus, said selecting means being located in opposed relation to said punching means and including a plurality of code members having elements arranged in a coded relationship, said frame having cam means extending across said perforating station and being mounted for rocking movement toward said selecting means, and actuator means movable across said perforating station through a power stroke from a home position to a full-stroke position to effect perforation of the record member, said actuator means having cam operating means arranged to contact said cam means during said power stroke to rock said frame toward said selecting means with said rows of punches moving progressively toward said selecting means for sequential contact of said selected punches with said elements whereby said record member is punched progressively.

4. Apparatus for providing coded perforations in a tape comprising means for feeding a tape past a perforating station, punching means at said station including a frame extending thereacross and a plurality of rows of punches carried by said frame, means for selecting which of said punches is activated to perforate said tape during a tape punching operation of the apparatus, said selecting means being located in opposed relation to said punching means, and including a plurality of code members having elements arranged in a coded relationship, said frame having cam means extending across said perforating station and being mounted for rocking movement toward said selecting means, and actuator means movable across said perforating station through a power stroke from a home position to a full-stroke position to effect perforation of the tape, said actuator means having cam operating means arranged to contact said cam means during said power stroke to rock said frame toward said selecting means with said rows of punches moving progressively toward said selecting means for sequential contact of said selected punches with said elements whereby said tape is punched progressively, said actuator means being movable through a return stroke from said full-stroke position to home position, and including means for positioning said cam operating means out of contacting relation with said cam means during said return stroke.

5. Apparatus for providing coded perforations in a record member at a perforating station comprising punching means at said perforating station including a movably mounted frame and a plurality of rows of punches carried by said frame, means for selecting which of said punches is activated to perforate said record member during a punching operation of the apparatus, said selecting means being located in opposed relation to said punching means and including a plurality of replaceable tokens having projections thereon aligned with selected punches, said projections being arranged in accordance with a code, and actuator means movable across said perforating station to effect perforation of the record member by contact between said projections and said selected punches said actuator means contacting said frame to move said rows of punches progressively toward said selecting means for sequential contact of said selected punches with said projections whereby said record member is punched progressively.

6. Apparatus for providing coded perforations in a record member at a perforating station comprising punching means at said station including a movably mounted frame and a plurality of rows of punches carried by said frame, means for selecting which of said punches is activated to perforate said record member during punching operation of the apparatus, said selecting means being located in opposed relation to said punching means and including a plurality of replaceable tokens having projections thereon aligned with selected punches and a plurality of adjustable discs movable selectively to present a plurality of circumferential portions thereof in opposed relation with rows of said punches, said portions having projections alignable with selected punches, said projections being arranged in accordance with a code, and actuator means movable across said perforating station to effect perforation of the record member by contact between said projections and said selected punches said actuator means contacting said frame to move said rows of punches progressively toward said selecting means for sequential contact of said selected punches with said projections whereby said record member is punched progressively.

7. Apparatus for providing coded perforations in a tape comprising means for feeding a tape past a perforating station, punching means at said station including a movably mounted frame and a plurality of rows of punches carried by said frame, means for selecting which of said punches is activated to perforate said tape during a tape punching operation of the apparatus, said selecting means being located in opposed relation to said punching means and including a plurality of code members having elements arranged in a coded relationship in alignment with selected punches, actuator means movable across said punching station through a power stroke from a home position to a full-stroke position to effect perforation of the tape by contact between said elements and said selected punches, said actuator means contacting said frame to move said rows of punches progressively toward said selecting means for sequential contact of said selected punches with said elements whereby said tape is punched progressively, said actuator means being movable through a return stroke from said full-stroke position to said home position, and means for effecting a feeding movement of said tape during said return stroke.

8. Apparatus for providing coded perforations in a tape comprising a supply of tape, a feed reel, a takeup reel, said tape passing from said supply to said feed reel to said takeup reel, a perforating station located along the path between said supply and said takeup reel, punching means at said station including a movably mounted frame and a plurality of rows of punches carried by said frame, means for selecting which of said punches is activated to perforate said tape during a tape punching operation of the apparatus, said selecting means being located in opposed relation to said perforating means and including a plurality of code members having elements arranged in a coded relationship in alignment with selected punches, actuator means movable through a power stroke and a return stroke, said actuator means moving across said perforating station during said power stroke to effect perforation of the tape by contact between said elements and said selected punches, said actuator means contacting said frame to move said rows of punches progressively toward said selecting means for sequential contact of said selected punches with said elements whereby said tape is punched progressively, means operatively connected between said actuator means and said feed reel for moving the latter to feed the tape during said return stroke, and means for disconnecting said operative connection during said power stroke.

9. Apparatus for providing coded perforations in a tape comprising a supply tape, a feed reel, a takeup reel, said tape passing from said supply to said feed reel to said takeup reel, a perforating station located along the path between said supply and said takeup reel, punching means at said station including a movably mounted frame and a plurality of rows of punches carried by said frame, means for selecting which of said punches is activated to perforate said tape during a tape punching operation of the apparatus, said selecting means being located in opposed relation to said punching means and including a plurality of code members having elements arranged in a coded relationship in alignment with selected punches, actuator means movable through a power stroke and a return stroke, said actuator means moving across said perforating station during said power stroke to effect perforation of the tape by contact between said elements and said selected punches, said actuator means contacting said frame to move said rows of punches progressively toward said selecting means for sequential contact of said selected punches with said elements whereby said tape is punched progressively, means operatively connected between said actuator means and said feed reel for moving the latter to feed the tape during said return stroke, means for disconnecting said operative connection during said power stroke and means operative during said return stroke for driving said takeup reel to wind the tape fed from said feed reel.

10. Apparatus for providing coded perforations in a record member at a perforating station comprising punching means at said station including a movably mounted frame and a plurality of rows of punches carried by said frame, means for selecting which of said punches is activated to perforate said record member during a punching operation of the apparatus, said selecting means being located in opposed relation to said punching means and including a plurality of code members having a elements arranged in a coded relationship in alignment with selected punches, actuator means movable across said perforating station through a power stroke from a home position to a full-stroke position to effect perforation of the record member by contact between said elements and said selected punches, said actuator means contacting said frame to move said rows of punches progressively toward said selecting means for sequential contact of said selected punches with said elements whereby said record member is punched progressively, said actuator means being movable through a return stroke from said full-stroke position to said home position, and full stroke means including a member operatively engageable with said actuator means for preventing return movement thereof toward said home position during said power stroke.

11. Apparatus for providing coded perforations in a record member at a perforating station comprising punching means at said station including a movably mounted frame and a plurality of rows of punches carried by said frame, means for selecting which of said punches is activated to perforate said record member during a operation of the apparatus, said selecting means being located in opposed relation to said punching means and including a plurality of code members having elements arranged in a coded relationship in alignment with selected punches, actuator means movable across said perforating station through a power stroke from a home position to a full-stroke position to effect perforation of the record member by contact between said elements and said selected punches, said actuator means contacting said frame to move said rows of punches progressively toward said selecting means for sequential contact of said selected punches with said elements whereby said record member is punched progressively, said actuator means being movable through a return stroke from said full-stroke position to said home position, and full stroke means including a member operatively engageable with said actuator means for preventing return movement thereof toward said home position during said power stroke and means for disengaging said member when said actuator means reaches said full-stroke position and re-engaging said member at the close of said return stroke.

12. Apparatus for providing coded perforations in a record member at a perforating station comprising punching means at said station including a movably mounted frame and a plurality of rows of punches carried by said frame, means for selecting which of said punches is activated to perforate said record member during a punching operation of the apparatus, said selecting means being located in opposed relation to said punching means and including plurality of code members having elements arranged in a coded relationship in alignment with selected punches, actuator means movable in a linear path across said perforating station to effect perforation of the record member by contact between said elements and said selected punches said actuator means contacting said frame to move said rows of punches progressively toward said selecting means for sequential contact of said selected punches with said elements whereby said record member is punched progressively, and means guiding said actuator means in said linear path.

13. Apparatus for providing coded perforations in a tape comprising means for feeding a tape past a perforating station including a sprocket drive member, punching means at said station including a movably mounted frame and a plurality of rows of punches carried by said frame, means for selecting which of said punches is activated to perforate said tape during a tape punching operation of the apparatus, said selecting means being located in opposed relation to said punching means and including a plurality of code members having elements arranged in a coded relationship in alignment with selected punches, and actuator means movable across said perforating station to effect perforation of the tape by contact between said elements and said selected punches, said actuator means contacting said frame to move said rows of punches progressively toward said selecting means for sequential contact of said selected punches with said elements whereby said tape is punched progressively, said punching means including a plurality of feed hole punches extending along the path of movement of the tape, said members including elements for contacting said feed hole punches during said frame movement for effecting the formation of feed holes in the tape.

14. Apparatus for providing coded perforations in a record member at a perforating station comprising punching means at the record member perforating station including a frame extending thereacross and a plurality of rows of punches carried by said frame, means for selecting which of said punches is activated to perforate said record member during a punching operation of the apparatus, said selecting means being located in opposed relation to said punching means, and including a plurality of code members having elements arranged in a coded relationship, said frame having cam means extending across said perforating station and being mounted for rocking movement toward said selecting means, and actuator means movable across said perforating station through a power stroke from a home position to a full-stroke position to effect perforation of the record member, said actuator means having cam operating means arranged to contact said cam means during said power stroke to rock said frame toward said selecting means with said rows of punches moving progressively toward said selecting means for sequential contact of said selected punches with said elements whereby said record member is punched progressively, said actuator means being movable through a return stroke from said full-stroke position to said home position, and including means for positioning said cam operating means out of contacting relation with said cam means during said return stroke.

15. Apparatus for providing coded perforations in a record member located at a perforating station comprising punching means at said perforating station including a movably mounted frame and a plurality of rows of punches carried by said frame, means for selecting which of said punches is activated to perforate said record member during a punching operation of the apparatus, said selecting means being located in opposed relation to said punching means and including a plurality of replaceable tokens having projections thereon aligned with selected punches, said projections being arranged in accordance with a code, and actuator means to effect perforation of the record member by contact between said projections and said selected punches, said actuator means contacting said frame to move said rows of punches toward said selecting means for contact of said selected punches with said projections whereby said record member is punched.

16. Apparatus for providing coded perforations in a record member located at a perforating station comprising punching means at said perforating station including a movably mounted frame and a plurality of rows of punches carried by said frame, means for selecting which of said punches is activated to perforate said record member during a punching operation of the apparatus, said selecting means being located in opposed relation to said perforating means and including a plurality of replaceable tokens having projections thereon aligned with selected punches and a plurality of adjustable discs movable selectively to present a plurality of circumferential portions thereof in opposed relation with rows of said punches, said portions having projections alignable with selected punches, said projections being arranged in accordance with a code, and actuator means movable to effect perforation of the record member by contact between said projections and said selected punches, said actuator means contacting said frame to move said rows of punches toward said selecting means for contact of said selected punches with said projections whereby said record member is punched.

References Cited in the file of this patent

UNITED STATES PATENTS

| | | |
|---|---|---|
| 1,083,541 | Kettnich | Jan. 6, 1914 |
| 1,285,837 | Swanson | Nov. 26, 1918 |
| 2,177,788 | Ross | Oct. 31, 1939 |
| 2,858,889 | Kent | Nov. 4, 1958 |
| 3,050,244 | Hohmann | Aug. 21, 1962 |